US012535095B2

United States Patent
Wei et al.

(10) Patent No.: US 12,535,095 B2
(45) Date of Patent: Jan. 27, 2026

(54) ANTI-DETACHMENT ELASTIC RETAINING RING CAPABLE OF SPRINGING BACK FOR SELF-LOCKING AND MOUNTING METHOD THEREOF

(71) Applicant: KERN-LIEBERS (TAICANG) CO., LTD., Suzhou (CN)

(72) Inventors: Weishang Wei, Suzhou (CN); Jianyi Chen, Suzhou (CN)

(73) Assignee: KERN-LIEBERS (TAICANG) CO., LTD., Suzhou (CN)

( * ) Notice: Subject to any disclaimer, the term of this patent is extended or adjusted under 35 U.S.C. 154(b) by 0 days.

(21) Appl. No.: 18/861,212

(22) PCT Filed: Apr. 1, 2024

(86) PCT No.: PCT/CN2024/085149
§ 371 (c)(1),
(2) Date: Oct. 29, 2024

(87) PCT Pub. No.: WO2025/007605
PCT Pub. Date: Jan. 9, 2025

(65) Prior Publication Data
US 2025/0257755 A1    Aug. 14, 2025

(30) Foreign Application Priority Data
Jul. 4, 2023    (CN) .......................... 202310808669.2

(51) Int. Cl.
*F16B 21/18*    (2006.01)
(52) U.S. Cl.
CPC .................. *F16B 21/186* (2013.01)
(58) Field of Classification Search
CPC .............................. F16B 21/18; F16B 21/186
See application file for complete search history.

(56) References Cited

U.S. PATENT DOCUMENTS

| | | | | |
|---|---|---|---|---|
| 2,595,787 A | * | 5/1952 | Heimann | F16B 21/18 285/321 |
| 2004/0247386 A1 | * | 12/2004 | Sugiyama | F16B 5/02 403/408.1 |
| 2007/0103263 A1 | * | 5/2007 | Gutierrez | F16B 21/18 335/220 |

FOREIGN PATENT DOCUMENTS

| | | |
|---|---|---|
| CN | 102720743 A | 10/2012 |
| CN | 203214527 U | 9/2013 |

(Continued)

OTHER PUBLICATIONS

GB/T894-2017: Retaining rings for shaft, China National Standarts, 2017, pp. 1-14, The General Administration of Quality Supervision, Inspection and Quarantine of the People's Republic of China; Standardization Administration of the People's Republic of China.

*Primary Examiner* — Matthew P Travers
(74) *Attorney, Agent, or Firm* — Bayramoglu Law Offices LLC

(57) ABSTRACT

The provided is an anti-detachment elastic retaining ring capable of springing back for self-locking and a mounting method thereof. The anti-detachment elastic retaining ring includes a retaining ring body, where the retaining ring body is provided with an opening; corresponding to two sides of the opening, two ends of the retaining ring body respectively form a first end and a second end; the first end and the second end interlock with each other; corresponding to interlocking front end positions of the first end and the second end, front ends of the first end and the second end are respectively provided with a first connecting extension section and a second connecting extension section; and the first connecting extension section and the second connecting extension section extend laterally to form a first limiting protrusion and a second limiting protrusion, respectively.

12 Claims, 11 Drawing Sheets

(56) References Cited

FOREIGN PATENT DOCUMENTS

| | | | | |
|---|---|---|---|---|
| CN | 203879883 U | | 10/2014 | |
| CN | 105378285 A | | 3/2016 | |
| CN | 207256152 U | | 4/2018 | |
| CN | 111306168 A | * | 6/2020 | |
| CN | 112352104 A | | 2/2021 | |
| CN | 213628374 U | | 7/2021 | |
| CN | 216077882 U | | 3/2022 | |
| DE | 19652937 A1 | * | 6/1998 | ............. F16B 21/18 |
| DE | 102022133010 A1 | | 6/2023 | |
| EP | 3022445 B1 | * | 8/2017 | ............. F04D 1/063 |
| EP | 3587819 A1 | | 1/2020 | |
| JP | S5048040 U | | 5/1975 | |
| JP | S5316950 U | | 2/1978 | |
| JP | S5675309 U | | 6/1981 | |
| JP | S59169421 U | | 11/1984 | |
| JP | H09100820 A | | 4/1997 | |
| JP | H09229035 A | | 9/1997 | |
| JP | 2020139512 A | | 9/2020 | |

\* cited by examiner

ANTI-DETACHMENT ELASTIC RETAINING RING CAPABLE OF SPRINGING BACK FOR SELF-LOCKING AND MOUNTING METHOD THEREOF

CROSS-REFERENCE TO THE RELATED APPLICATIONS

This application is the national phase entry of International Application No. PCT/CN2024/085149, filed on Apr. 1, 2024, which is based upon and claims priority to Chinese Patent Application No. 202310808669.2, filed on Jul. 4, 2023, the entire contents of which are incorporated herein by reference.

TECHNICAL FIELD

The present disclosure relates to the technical field of manufacturing of anti-detachment elastic retaining rings, and in particular to an anti-detachment elastic retaining ring capable of springing back for self-locking and a mounting method thereof.

BACKGROUND

Standard elastic or split retaining rings for shafts are often used for axial positioning of bearings. In the electric drive bridge structure of new energy or electric vehicles, it is necessary to use elastic retaining rings to achieve an axial limit. With the development of high-voltage platforms, the era of high speed is approaching. The maximum output speed of some motors has reached 20,000 rpm or more, and the speed of the gear shaft connected to them has correspondingly increased. At such high speeds, traditional split elastic retaining rings for shafts are prone to detaching from the groove under centrifugal force, posing a safety hazard. Therefore, there is an urgent need for an anti-detachment elastic retaining ring for a shaft to meet future working conditions.

In the existing anti-detachment elastic retaining ring, such as the elastic retaining ring for a shaft disclosed by Chinese patent application CN202022546754.0, a protrusion is embedded in a recess to make upper and lower clamping elements to interlock with each other, increasing the impact resistance of the retaining ring. In addition, a reinforcing rib is provided to make the retaining ring body less prone to deformation when subjected to lateral force impact, avoiding the retaining ring body from detaching from the shaft groove after deformation and further increasing stability. However, the elastic retaining ring has the following drawbacks. On the one hand, the elastic retaining ring is in a detached state in its original state. Thus, when the retaining ring is in a closed state, it produces an elastic force for outward expansion, thereby leading to poor overall stability. On the other hand, to insert the retaining ring into the shaft groove, an additional operation of closing the retaining ring is required. This increases the step of closing the retaining ring during mass assembly and requires the design of an additional execution mechanism. As a result, the difficulty and complexity of designing the automated assembly line are increased.

SUMMARY

To overcome the above-mentioned shortcomings of the prior art, the present disclosure provides an anti-detachment elastic retaining ring capable of springing back for self-locking, which applies to high-speed shafts, and features easy mounting, and is suitable for automatic mounting.

The above objective of the present disclosure is achieved by the following technical solutions:

An anti-detachment elastic retaining ring capable of springing back for self-locking includes a retaining ring body, where the retaining ring body is provided with an opening; and corresponding to two sides of the opening, two ends of the retaining ring body respectively form a first end and a second end;

when the retaining ring body is in an original state, the first end and the second end interlock with each other; corresponding to interlocking front end positions of the first end and the second end, front ends of the first end and the second end are respectively provided with a first connecting extension section and a second connecting extension section; the first connecting extension section and the second connecting extension section extend laterally to form a first limiting protrusion and a second limiting protrusion, respectively; the first limiting protrusion and the second limiting protrusion are located at an inner side of each other in a circumferential direction of the retaining ring body; adjacent sides of the first limiting protrusion and the second limiting protrusion are provided with locking fitting surfaces; and a side of the first limiting protrusion away from the second limiting protrusion and/or a side of the second limiting protrusion away from the first limiting protrusion is provided with an inclined guide surface;

when the retaining ring body expands outward from a locked state, the two locking fitting surfaces are fitted and interlocked with each other, preventing the retaining ring body from expanding outward to a detached state; and through the inclined guide surface, the retaining ring body is reset to the locked state from the detached state by a rebound force of the retaining ring body.

In the above structure, the first connecting extension section and the second connecting extension section interlock with each other. That is, the first connecting extension section is located at a side of the second connecting extension section, and the front end of the first connecting extension section extends to a position between an end and a root of the second connecting extension section. In other words, the first connecting extension section and the second connecting extension section interlock with each other in the circumferential direction of the retaining ring body. The first limiting protrusion and the second limiting protrusion are located at the inner side of each other. The first limiting protrusion is located at a side of the second limiting protrusion away from an outer end of the second connecting extension. When the first limiting protrusion and the second limiting protrusion are located at an outer side of each other, the first limiting protrusion is located at a side of the second limiting protrusion close to the outer end of the second connecting extension. The principle of the anti-detachment elastic retaining ring capable of springing back for self-locking is as follows. When the two locking fitting surfaces are facing each other, the first limiting protrusion and the second limiting protrusion are located at the inner side of each other in the circumferential direction of the retaining ring body, and the retaining ring body is in a locked state. When the two locking fitting surfaces are facing away from each other, especially when the first limiting protrusion and the second limiting protrusion are located at the outer side of each other in the circumferential direction of the retaining ring body, the retaining ring body is in a detached state.

Therefore, the retaining ring body is in a locked state in its original state. When the retaining ring body is mounted in a shaft groove, the retaining ring body is in a locked state. The retaining ring body will not detach due to its own elastic force and has the advantage of good stability. The retaining ring body is mounted on a high-speed shaft. When the shaft speed reaches a certain value, the retaining ring body expands outward from the locked state. When the retaining ring body expands outward to a certain extent, the two locking fitting surfaces are fitted and interlocked with each other to prevent the retaining ring body from expanding outward to a detached state. Therefore, the anti-detachment elastic retaining ring capable of springing back for self-locking described in the present disclosure is suitable for high-speed shafts and features integrated design, simple structure, low manufacturing cost, and good reliability.

When the retaining ring body is in a detached state due to external force, the first limiting protrusion and the second limiting protrusion are located at the outer side of each other. At this point, the inclined guide surface is located between the first limiting protrusion and the second limiting protrusion. When the external force acting on the retaining ring body is reduced or eliminated, due to the rebound force of the retaining ring body itself and the interlocking of the first limiting protrusion and the second limiting protrusion, the first limiting protrusion and the second limiting protrusion come into contact with each other at the outer side. At this point, due to the action of the inclined guide surface, the first connecting extension section and the second connecting extension section move away from each other in, causing the first limiting protrusion and the second limiting protrusion to move to the inner side of each other in the circumferential direction of the retaining ring body. In this way, the retaining ring body automatically resets to the locked state by the rebound force. Based on the above principle, the anti-detachment elastic retaining ring capable of springing back for self-locking described in the present disclosure can eliminate the execution mechanism for locking operation during automated assembly, and even eliminate the takt of locking operation, thereby improving assembly efficiency and suiting for automated production.

Further, in the anti-detachment elastic retaining ring capable of springing back for self-locking, the retaining ring body in the original state is in a sheet-like shape as a whole. In a preferred solution of the present disclosure, the anti-detachment elastic retaining ring capable of springing back for self-locking described in the present disclosure can be directly formed from a sheet material through a one-time machining process such as wire cutting or stamping. It has the advantages of low manufacturing cost and economy.

Further, in the anti-detachment elastic retaining ring capable of springing back for self-locking, when the retaining ring body is in the original state, the second connecting extension section is located at an outer side of the first connecting extension section in a radial direction of the retaining ring body. In a preferred solution of the present disclosure, the first connecting extension section and the second connecting extension section are spaced radially apart. The spaced-apart design relative to an axial direction is convenient for processing and ensures low manufacturing costs. On the other hand, it has low requirements for the width of the groove for mounting the retaining ring body, that is, the axial movement space of the retaining ring body mounted is small.

Further, in the anti-detachment elastic retaining ring capable of springing back for self-locking, the anti-detachment elastic retaining ring further includes disassembly holes, where the disassembly holes include a first disassembly hole; and the first disassembly hole is provided at the second end. In a preferred solution of the present disclosure, when the retaining ring body is mounted in the groove, it is in a locked state. When a tool passes through the first disassembly hole and applies a force to a radial outer side of the retaining ring body, the second connecting extension section is opened until the retaining ring body is in a detached state, in order to remove the retaining ring body mounted in the groove.

Further, in the anti-detachment elastic retaining ring capable of springing back for self-locking, the disassembly holes further include a second disassembly hole; and the second disassembly hole is provided at the first end. In a preferred solution of the present disclosure, the disassembly holes are arranged in a pair at the two ends of the retaining ring body, facilitating the insertion of snap ring pliers into the two disassembly holes to remove the retaining ring body mounted in the groove.

Further, in the anti-detachment elastic retaining ring capable of springing back for self-locking, front ends of the first limiting protrusion and the second limiting protrusion in an extension direction extend towards the inner side of each other in the circumferential direction of the retaining ring body to form a pair of interlocking hooks; and the locking fitting surface is located at an inner side of the hook. In a preferred solution of the present disclosure, the interlocking hook structures have the advantage of reliable locking.

Further, in the anti-detachment elastic retaining ring capable of springing back for self-locking, when the retaining ring body is in the original state, the first limiting protrusion and the second limiting protrusion are separated by a preset distance. In a preferred solution of the present disclosure, based on the above structure, an inner diameter dimension of the retaining ring body in its original state is smaller than a corresponding groove diameter. When the retaining ring body is fitted inside the groove, the distance between the first limiting protrusion and the second limiting protrusion is less than the preset distance. Therefore, the retaining ring body can generate a certain clamping force to prevent the retaining ring body mounted in the groove from shaking.

Further, in the anti-detachment elastic retaining ring capable of springing back for self-locking, when the first limiting protrusion and the second limiting protrusion are offset from each other by the preset distance in an axial direction, the retaining ring body is in an axially unlocked state; and the retaining ring body is able to reset from the axially unlocked state to the locked state by the rebound force of the retaining ring body. In a preferred solution of the present disclosure, when the retaining ring body is in the axially unlocked state, if the retaining ring body expands outward, the two locking fitting surfaces will not come into contact with each other. Therefore, in this state, the retaining ring body can continue to expand outward to a detached state. The implementation of this function depends on the material properties and structural parameters of the retaining ring body.

Further, in the anti-detachment elastic retaining ring capable of springing back for self-locking, an end surface of the first end or the second end is provided with a release protrusion. In a preferred solution of the present disclosure, when a flat tool presses down on one end surface of the retaining ring body corresponding to one side of the release protrusion, the first end or the second end at the one side is axially pushed by the release protrusion. Thus, the two locking fitting surfaces of the first limiting protrusion and the second limiting protrusion are offset in the axial direction of the retaining ring body. At this point, the retaining ring body enters the axially unlocked state. In the axially unlocked state, if the retaining ring body expands outward, the two locking fitting surfaces will not come into contact with each other. Therefore, the retaining ring body can continue to expand outward. Based on the above principle, existing elastic retaining ring mounting tool can be used to automatically mount the retaining ring body into the groove of the target mounting shaft, and after mounting, the release protrusion can be removed. Specifically, the existing elastic retaining ring mounting tool can refer to the elastic retaining ring mounting tool disclosed by Chinese patent application 201720993374.7.

A mounting method for the anti-detachment elastic retaining ring capable of springing back for self-locking includes the following steps:

step S1: unlocking: changing the retaining ring body from the original state to the detached state;

step S2: expansion: expanding the retaining ring body until an inner diameter of the retaining ring body is greater than or equal to a diameter of the target mounting shaft;

step S3: movement: moving the retaining ring body axially to an axial outer side of a groove; and step S4: insertion: moving the retaining ring body axially into the groove, such that the retaining ring body is reset from the detached state to the locked state due to the rebound force of the retaining ring body and is clamped into the groove. In a preferred solution of the present disclosure, based on the above method, the anti-detachment elastic retaining ring capable of springing back for self-locking described in the present disclosure can eliminate the execution mechanism for locking operation during automated assembly, and even eliminate the takt of locking operation, thereby improving assembly efficiency and suiting for automated production.

As can be seen from the above technical solutions, the present disclosure has the following beneficial effects:

1. In the anti-detachment elastic retaining ring capable of springing back for self-locking described in the present disclosure, the retaining ring body is in a locked state in its original state. When the retaining ring body is mounted in a shaft groove, the retaining ring body is in a locked state. The retaining ring body will not detach due to its own elastic force and has the advantage of good stability. The retaining ring body is mounted on a high-speed shaft. When the shaft speed reaches a certain value, the retaining ring body expands outward from the locked state. When the retaining ring body expands outward to a certain extent, the two locking fitting surfaces are fitted and interlocked with each other to prevent the retaining ring body from expanding outward to a detached state. Therefore, the anti-detachment elastic retaining ring capable of springing back for self-locking described in the present disclosure is suitable for high-speed shafts and features integrated design, simple structure, low manufacturing cost, and good reliability.

2. The anti-detachment elastic retaining ring capable of springing back for self-locking described in the present disclosure can eliminate the execution mechanism for locking operation during automated assembly, and even eliminate the takt of locking operation, thereby improving assembly efficiency and suiting for automated production.

3. In the anti-detachment elastic retaining ring capable of springing back for self-locking described in the present disclosure, the retaining ring body in the original state is in a sheet-like shape as a whole. The anti-detachment elastic retaining ring capable of springing back for self-locking described in the present disclosure can be directly formed from a sheet material through a one-time machining process such as wire cutting or stamping. It has the advantages of low manufacturing cost and economy.

Figure 1:
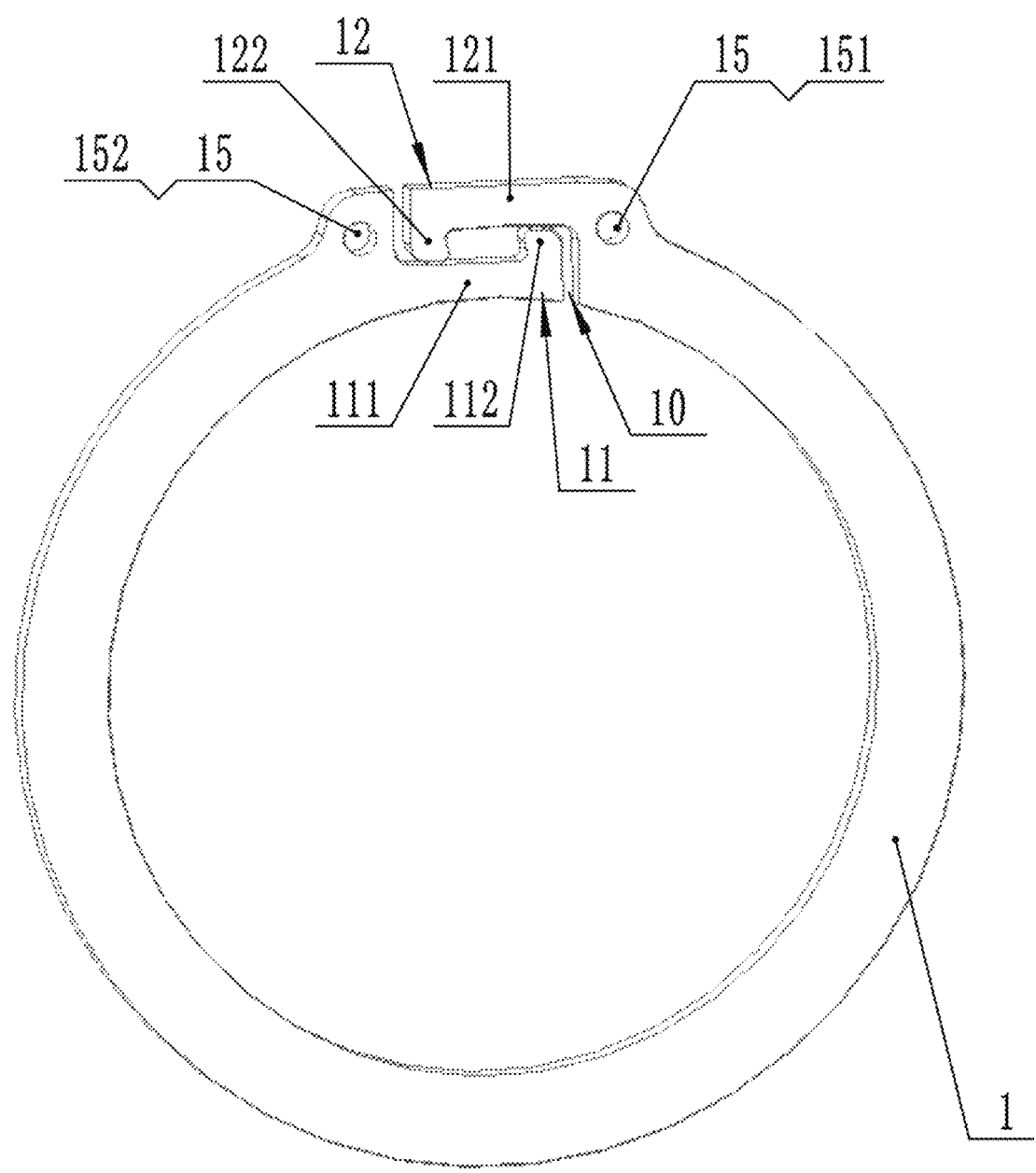
FIG. 1 is a structural diagram of an anti-detachment elastic retaining ring capable of springing back for self-locking in an original state according to an embodiment of the present disclosure.

Reference Numerals: 1. retaining ring body; 10. opening; 11. first end; 111. first connecting extension; 112. first limiting protrusion; 12. second end; 121. second connecting extension; 122. second limiting protrusion; 13. hook; 130. locking fitting surface; 14. inclined guide surface; 15. disassembly hole; 151. first disassembly hole; and 152. second disassembly hole;

2. guide sleeve; and 21. conical section;

3. pressing sleeve;

4. target mounting shaft; and 41. groove; and

5. release protrusion; and 51. transition fitting surface.

DETAILED DESCRIPTION OF THE EMBODIMENTS

The embodiments of the present disclosure are described below in detail. Examples of the embodiments are shown in the drawings. The same or similar numerals represent the same or similar elements or elements having the same or similar functions throughout the specification. The embodiments described below with reference to the accompanying drawings are exemplary, and are intended to explain the present disclosure but should not be construed as a limitation to the present disclosure.

It should be understood that in the description of the present disclosure, the terms such as "central", "longitudinal", "transverse", "length", "width", "thickness", "upper", "lower", "front", "back", "left", "right", "vertical", "horizontal", "top", "bottom", "inner", "clockwise", and "anticlockwise" are intended to indicate orientation or positional relations shown in the drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure.

In addition, the terms such as "first" and "second" are used only for descriptive purposes, and should not be construed as indicating or implying relative importance or implying the number of indicated technical features. Thus, features defined with "first" and "second" may explicitly or implicitly include one or more of the features. In the description of the present disclosure, unless otherwise specifically defined, "a plurality of" means two or more.

In the present disclosure, unless otherwise clearly specified and defined, the terms "mounted", "connected with", "connected to", and "fixed" should be understood in a broad sense. For example, the connection may be a fixed connection, a detachable connection or an integrated connection, may be a mechanical connection or an electrical connection, may be a direct connection or an indirect connection with use of an intermediate medium, or may be intercommunication between two components. Those of ordinary skill in the art may understand specific meanings of the above terms in the present disclosure based on a specific situation. Those of ordinary skill in the art may understand specific meanings of the above terms in the present disclosure based on a specific situation.

In the present disclosure, unless otherwise expressly specified, when it is described that a first feature is "above" or "under" a second feature, it may indicate that the first feature is in direct contact with the second feature, or that the first feature and the second feature are not in direct contact with each other but are in contact via another feature between them. In addition, that the first feature is "over", "above", and "on" the second feature includes that the first feature is directly above and diagonally above the second feature, or simply indicates that a horizontal height of the first feature is larger than that of the second feature. "A first feature is under and below a second feature" includes "the first feature is directly under or obliquely under the second feature" or simply means that "the first feature is lower than the second feature".

Embodiment 1

Figure 2:
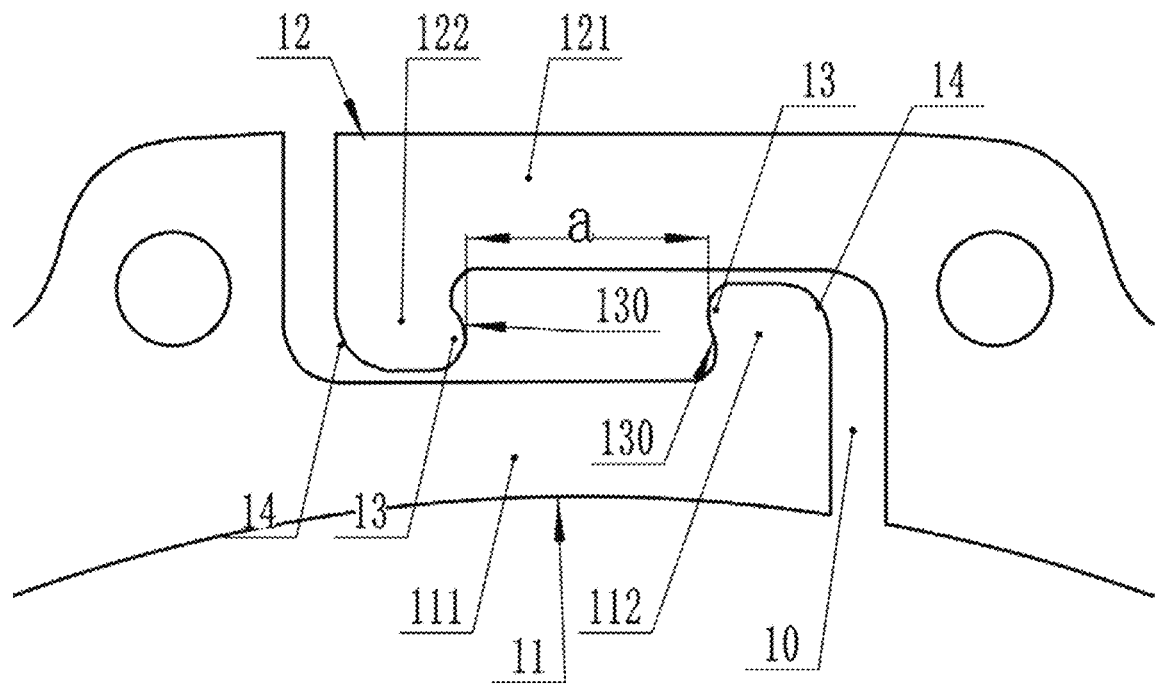
FIG. 2 is a detail of an opening shown in FIG. 1.

As shown in FIGS. 1 and 2, an anti-detachment elastic retaining ring capable of springing back for self-locking includes retaining ring body 1. The retaining ring body 1 is provided with opening 10. Corresponding to two sides of the opening 10, two ends of the retaining ring body 1 respectively form first end 11 and second end 12.

When the retaining ring body 1 is in an original state, the first end 11 and the second end 12 interlock with each other. Corresponding to interlocking front end positions of the first end 11 and the second end 12, front ends of the first end 11 and the second end 12 are respectively provided with first connecting extension section 111 and second connecting extension section 121. The first connecting extension section 111 and the second connecting extension section 121 extend laterally to form first limiting protrusion 112 and second limiting protrusion 122, respectively. The first limiting protrusion 112 and the second limiting protrusion 122 are located at an inner side of each other in a circumferential direction of the retaining ring body 1. Adjacent sides of the first limiting protrusion 112 and the second limiting protrusion 122 are provided with locking fitting surfaces 130. A side of the first limiting protrusion 112 away from the second limiting protrusion 122 and/or a side of the second limiting protrusion 122 away from the first limiting protrusion 112 is provided with inclined guide surface 14. In this embodiment, the first limiting protrusion 112 and the second limiting protrusion 122 are respectively provided with inclined guide surfaces 14. The first limiting protrusion 112 and the second limiting protrusion 122 are respectively located at front ends of the first connecting extension section 111 and the second connecting extension section 121.

When the retaining ring body 1 expands outward from a locked state, the two locking fitting surfaces 130 are fitted and interlocked with each other, preventing the retaining ring body 1 from expanding outward to a detached state.

Through the inclined guide surface 14, the retaining ring body 1 is reset to the locked state from the detached state by its own rebound force.

In the above structure, as shown in FIG. 2, the first connecting extension section 111 and the second connecting extension section 121 interlock with each other. That is, the first connecting extension section 111 is located at a side of the second connecting extension section 121, and the front end of the first connecting extension section 111 extends to a position between an end and a root of the second connecting extension section 121. In other words, the first connecting extension section 111 and the second connecting extension section 121 interlock with each other in the circumferential direction of the retaining ring body 1. The first limiting protrusion 112 and the second limiting protrusion 122 are located at the inner side of each other in the circumferential direction of the retaining ring body 1. The first limiting protrusion 112 is located at a side of the second limiting protrusion 122 away from an outer end of the second connecting extension 121. When the first limiting protrusion 112 and the second limiting protrusion 122 are located at an outer side of each other in the circumferential direction of the retaining ring body 1, the first limiting protrusion 112 is located at a side of the second limiting protrusion 122 close to the outer end of the second connecting extension 121. In this embodiment, the first limiting protrusion 112 and the second limiting protrusion 122 are located at adjacent sides of the first connecting extension section 111 and the second connecting extension section 121, and extend in opposite directions to each other. The first limiting protrusion 112 and the second limiting protrusion 122 interlock with each other in the extension directions. Specifically, the inclined guide surface 14 is located at an outer side of a front end of the limiting protrusion in the extension direction. In this embodiment, the inclined guide surface 14 is a curved surface with a rounded corner.

Figure 3:
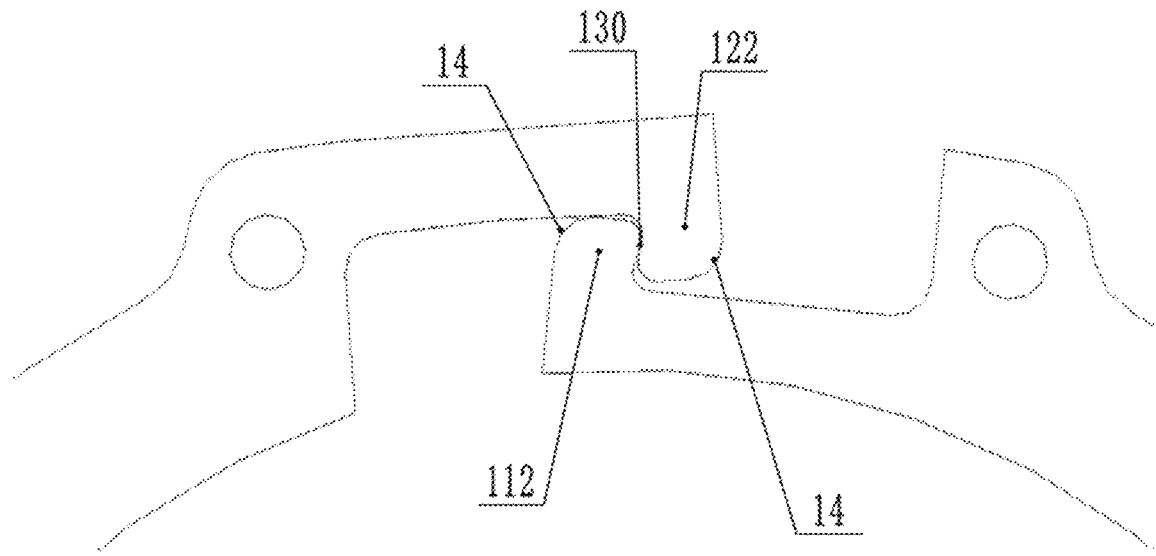
FIG. 3 is a schematic diagram showing that locking fitting surfaces of the anti-detachment elastic retaining ring capable of springing back for self-locking in a locked state are locked and fitted with each other.
Figure 4:
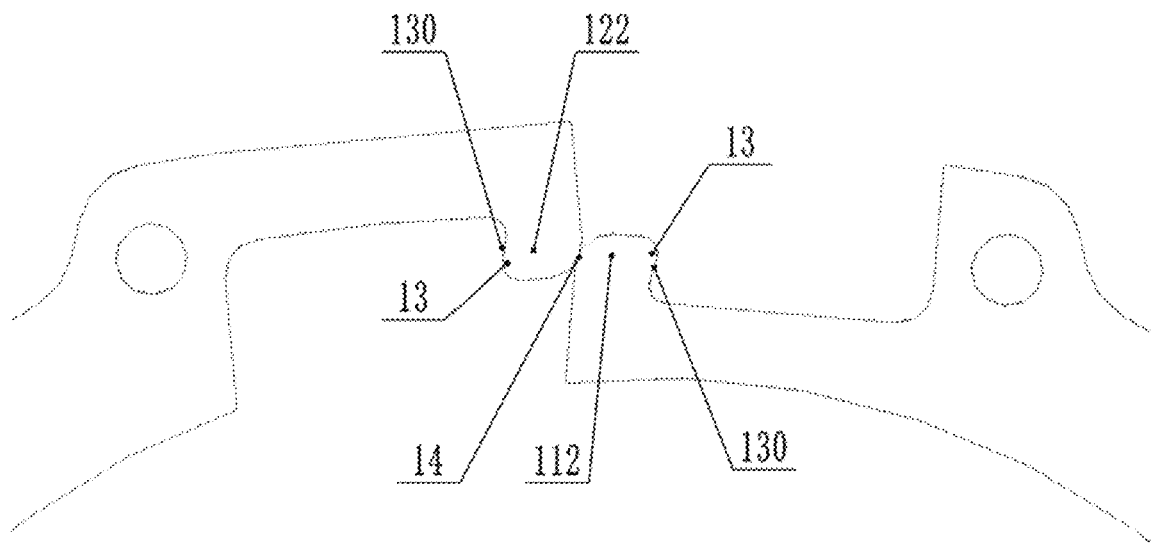
FIG. 4 is a schematic diagram of the anti-detachment elastic retaining ring capable of springing back for self-locking in a detached state.

The principle of the anti-detachment elastic retaining ring capable of springing back for self-locking is as follows. As shown in FIGS. 2 and 3, when the two locking fitting surfaces 130 are facing each other, the first limiting protrusion 112 and the second limiting protrusion 122 are located at the inner side of each other in the circumferential direction of the retaining ring body 1, and the retaining ring body 1 is in a locked state. As shown in FIG. 4, when the two locking fitting surfaces 130 are facing away from each other, especially when the first limiting protrusion 112 and the second limiting protrusion 122 are located at the outer side of each other in the circumferential direction of the retaining ring body 1, the retaining ring body 1 is in a detached state. Therefore, the retaining ring body 1 is in a locked state in its original state. When the retaining ring body 1 is mounted in a shaft groove, the retaining ring body 1 is in a locked state. The retaining ring body 1 will not detach due to its own elastic force and has the advantage of good stability. The retaining ring body is mounted on a high-speed shaft. When the shaft speed reaches a certain value, the retaining ring body 1 expands outward from the locked state. When the retaining ring body expands outward to a certain extent, the two locking fitting surfaces 130 are fitted and interlocked with each other to prevent the retaining ring body 1 from expanding outward to a detached state. Therefore, the anti-detachment elastic retaining ring capable of springing back for self-locking described in the present disclosure is suitable for high-speed shafts and features integrated design, simple structure, low manufacturing cost, and good reliability. When the retaining ring body 1 is in a detached state due to external force, the first limiting protrusion 112 and the second limiting protrusion 122 are located at the outer side of each other. At this point, the inclined guide surface 14 is located between the first limiting protrusion 112 and the second limiting protrusion 122. When the external force acting on the retaining ring body 1 is reduced or eliminated, due to the rebound force of the retaining ring body 1 itself and the interlocking of the first limiting protrusion 112 and the second limiting protrusion 122, the first limiting protrusion 112 and the second limiting protrusion 122 come into contact with each other at the outer side. At this point, due to the action of the inclined guide surface 14, the first connecting extension section 111 and the second connecting extension section 121 move away from each other in, causing the first limiting protrusion 112 and the second limiting protrusion 122 to move to the inner side of each other in the circumferential direction of the retaining ring body 1. In this way, the retaining ring body automatically resets to the locked state by the rebound force. Based on the above principle, the anti-detachment elastic retaining ring capable of springing back for self-locking described in the present disclosure can eliminate the execution mechanism for locking operation during automated assembly, and even eliminate the takt of locking operation, thereby improving assembly efficiency and suiting for automated production.

In this embodiment, the retaining ring body 1 is in a sheet-like shape as a whole in its original state. Therefore, the anti-detachment elastic retaining ring capable of springing back for self-locking described in the present disclosure can be directly formed from a sheet material through a one-time machining process such as wire cutting or stamping. It has the advantages of low manufacturing cost and economy. Specifically, in this embodiment, the retaining ring body 1 is in the shape of a ring platform as a whole, and two axial end surfaces of the retaining ring body 1 are flat.

The retaining ring body can be made of a spring steel sheet through a one-time machining process such as stamping or wire cutting. The above structure is different from the elastic retaining ring for a shaft of electric vehicle reducer disclosed in Chinese patent document 202121468092.8. In this disclosure, the elastic retaining ring is in a spiral shape in its original state, resulting in complex manufacturing and high costs.

As shown in FIGS. 1 and 2, in this embodiment, when the retaining ring body 1 is in its original state, the second connecting extension section 121 is located at the outer side of the first connecting extension section 111 in a radial direction of the retaining ring body 1.

The first connecting extension section 111 and the second connecting extension section 121 are spaced radially apart. The spaced-apart design relative to an axial direction is convenient for processing and ensures low manufacturing costs. On the other hand, it has low requirements for the width of the groove for mounting the retaining ring body 1, that is, the axial movement space of the retaining ring body 1 mounted is small.

As shown in FIG. 1, in this embodiment, the anti-detachment elastic retaining ring further includes disassembly holes 15. The disassembly holes 15 include first disassembly hole 151. The first disassembly hole 151 is provided at the second end 12. When the retaining ring body 1 is mounted in the groove, it is in a locked state. When a tool passes through the first disassembly hole 151 and applies a force to an radial outer side of the retaining ring body 1, the second connecting extension section 121 is opened until the retaining ring body 1 is in a detached state, in order to remove the retaining ring body 1 mounted in the groove. In this embodiment, the disassembly holes 15 further include second disassembly hole 152. The second disassembly hole 152 is provided at the first end 11. The disassembly holes 15 are arranged in a pair at the two ends of the retaining ring body 1, facilitating the insertion of snap ring pliers into the two disassembly holes 15 to remove the retaining ring body 1 mounted in the groove. In the present disclosure, the first disassembly hole 151 and the second disassembly hole 152 are respectively located at roots of the second end 12 and the first end 11 corresponding to the second connecting extension section 121 and the first connecting extension section 111.

As shown in FIG. 2, in this embodiment, the front ends of the first limiting protrusion 112 and the second limiting protrusion 122 in the extension direction extend toward the inner side of each other in the circumferential direction of the retaining ring body 1 to form a pair of interlocking hooks 13. The locking fitting surface 130 is located at an inner side of the hook 13. The interlocking hook structures have the advantage of reliable locking. It should be noted that the interlocking structures are not limited to the hooks 13 described in this embodiment, and can be limiting fit structures such as tooth portions that cooperate with each other or a male portion and a female portion that cooperate with each other.

As shown in FIG. 2, in this embodiment, when the retaining ring body 1 is in its original state, the first limiting protrusion 112 and the second limiting protrusion 122 are separated by a preset distance of a. Based on the above structure, an inner diameter dimension of the retaining ring body 1 in its original state is smaller than a corresponding groove diameter. When the retaining ring body 1 is fitted inside the groove, the distance between the first limiting protrusion 112 and the second limiting protrusion 122 is less than the preset distance. Therefore, the retaining ring body 1 can generate a certain clamping force to prevent the retaining ring body 1 mounted in the groove from shaking.

Figure 10:
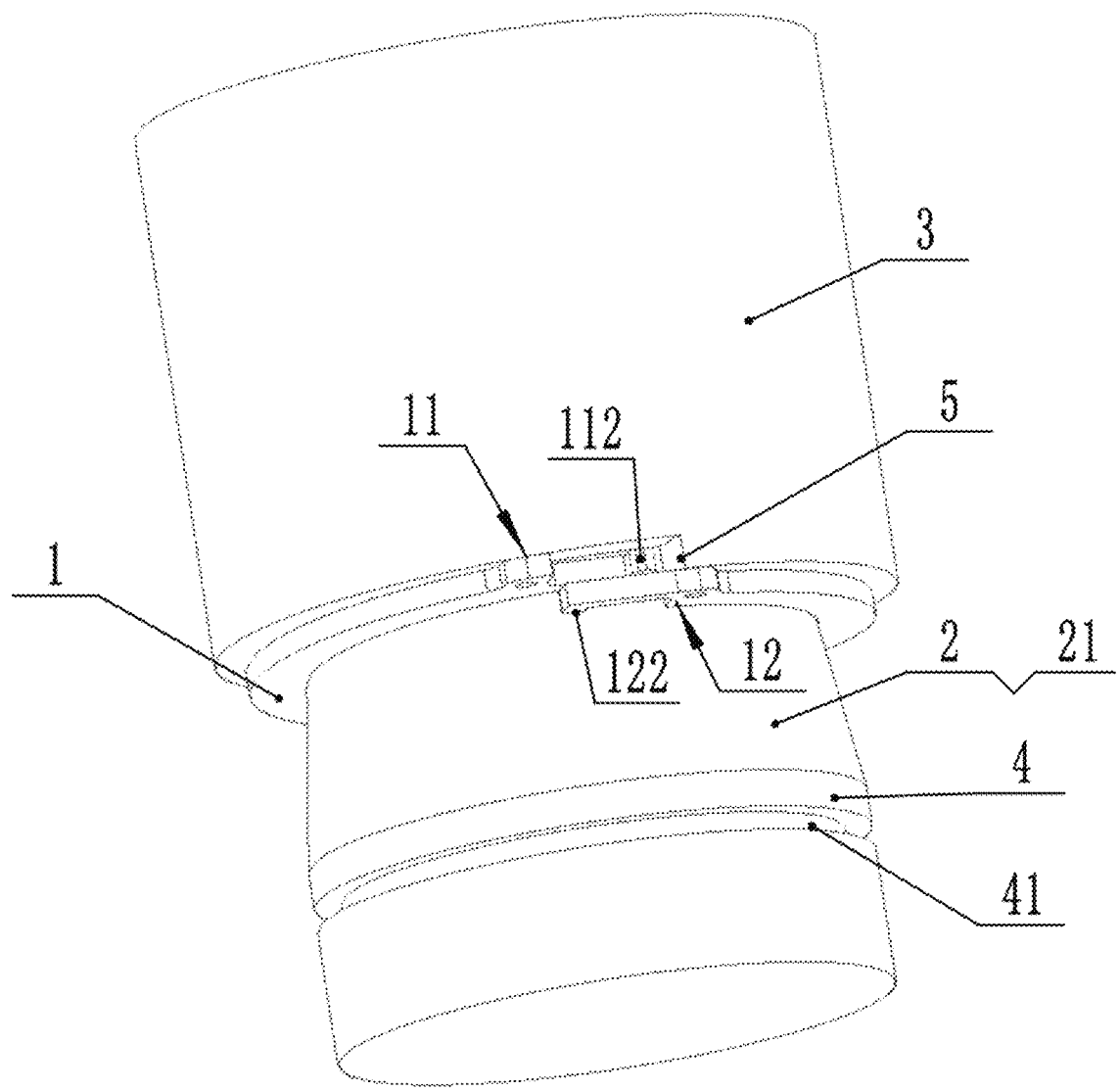
FIG. 10 is a schematic diagram of step S11 of a usage method of the mounting device for an anti-detachment elastic retaining ring according to an embodiment of the present disclosure.
Figure 11:
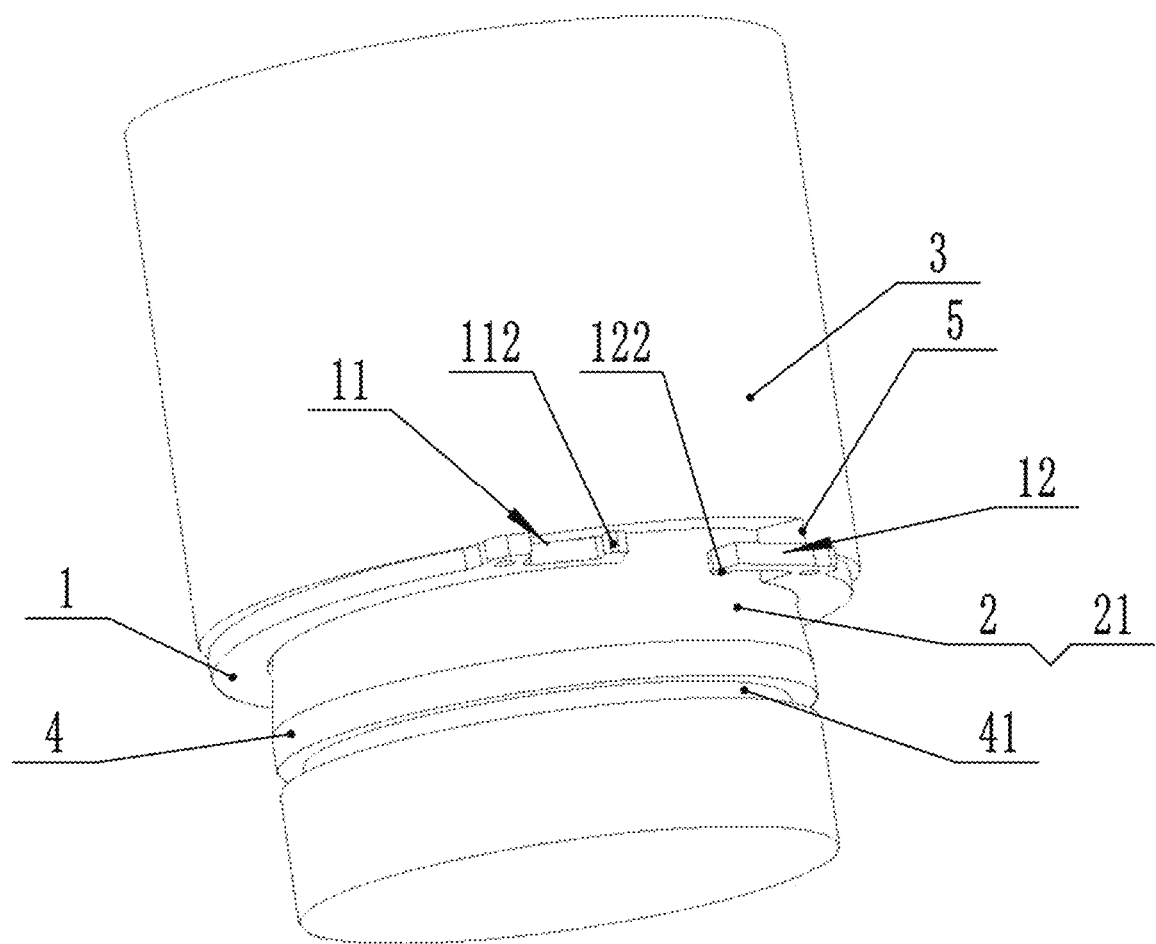
FIG. 11 is a schematic diagram of step S12 of the usage method of the mounting device for an anti-detachment elastic retaining ring according to an embodiment of the present disclosure.
Figure 12:
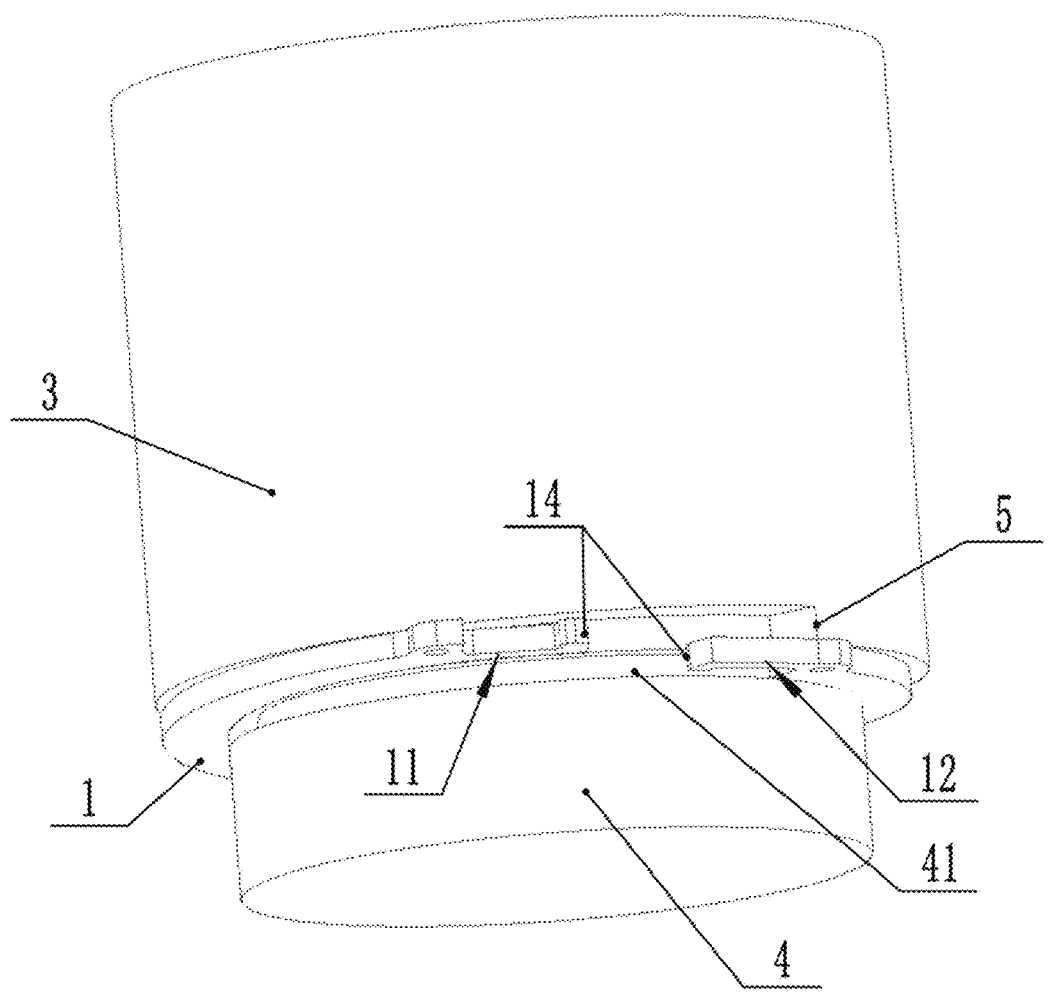
FIG. 12 is a schematic diagram of step S41 of the usage method of the mounting device for an anti-detachment elastic retaining ring according to an embodiment of the present disclosure.
Figure 13:
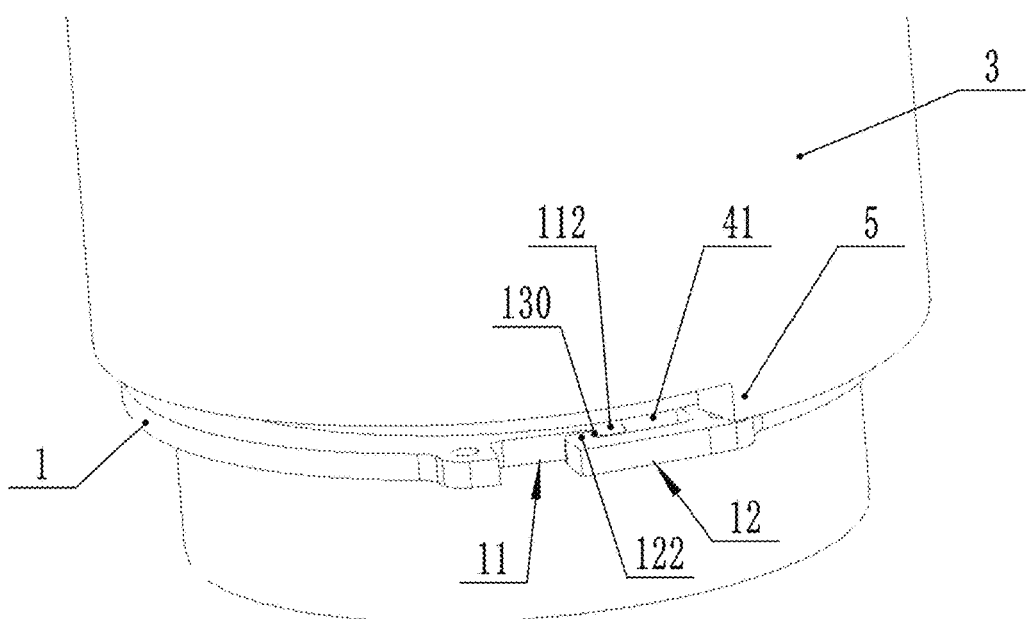
FIG. 13 is a schematic diagram showing that the retaining ring body is fully inserted into a groove.
Figure 14:
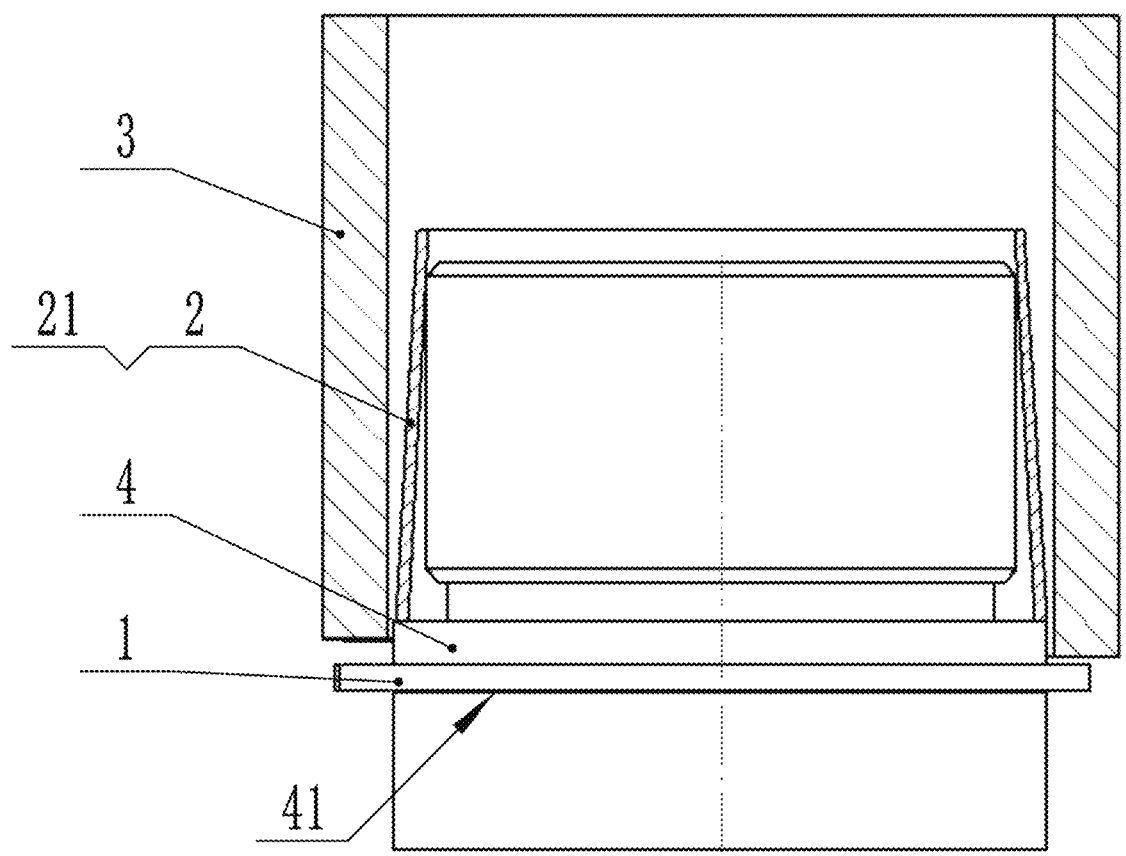
FIG. 14 is a section view based on FIG. 13.

As shown in FIG. 10, in this embodiment, the first limiting protrusion 112 and the second limiting protrusion 122 are offset from each other by a preset distance in the axial direction. At this point, the retaining ring body 1 is in an axially unlocked state, so the retaining ring body 1 can be reset from the axially unlocked state to the locked state by its own rebound force.

As shown in FIGS. 10 to 13, the retaining ring body 1 is in an axially unlocked state. At this point, when the retaining ring body 1 expands outward, the two locking fitting surfaces 130 will not come into contact with each other. Therefore, the retaining ring body 1 can continue to expand outward to the detached state. The implementation of this function depends on the material properties and structural parameters of the retaining ring body 1. In this embodiment, the retaining ring body 1 is made of spring steel. The overall dimensional parameters of the retaining ring body 1 refer to the open snap ring design in standard GB/T894-2017. Correspondingly, the dimensions of the mounting groove should conform to this standard to achieve the above function. In addition, the design has a wide range of applications. For special application scenarios, the dimension parameters can be adaptively modified.

Specifically, the retaining ring body 1 features an inner diameter of 45.8 mm, an outer diameter of 56 mm, a thickness of 2 mm, and is made of 60Si2Mn. When the second connecting extension section 121 is pressed down until an axial displacement of the second limiting protrusion 122 is greater than 2 mm, the retaining ring body 1 is in an axially unlocked state. The force that presses down the second connecting extension section 121 is eliminated without applying a radial force for outward expansion. Thus, the retaining ring body 1 can be reset from the axially unlocked state to the locked state by its own rebound force.

Embodiment 2

Figure 5:
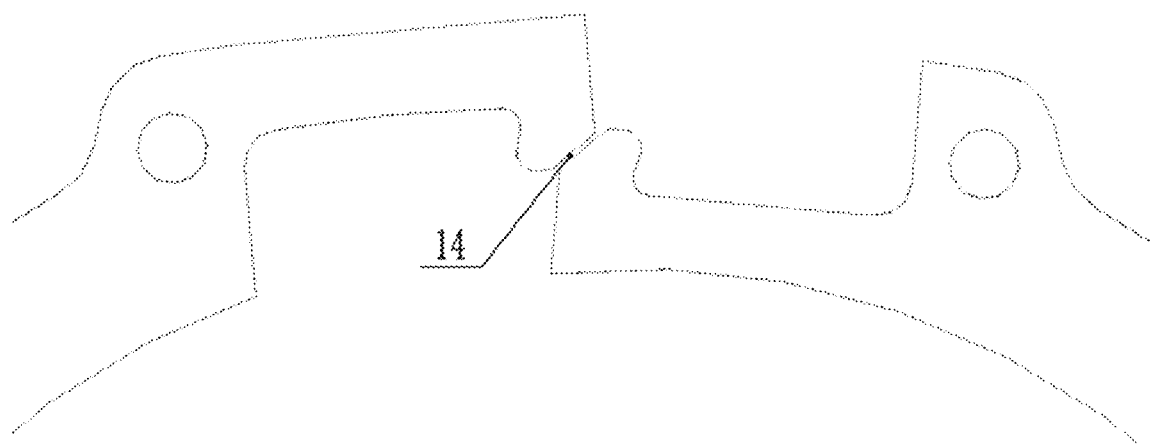
FIG. 5 is a schematic diagram of inclined guide surfaces that are flat surfaces.

As shown in FIG. 5, this embodiment differs from Embodiment 1 in that the inclined guide surface 14 in this embodiment is a slanted plane with a chamfered shape.

Embodiment 3

Figure 6:
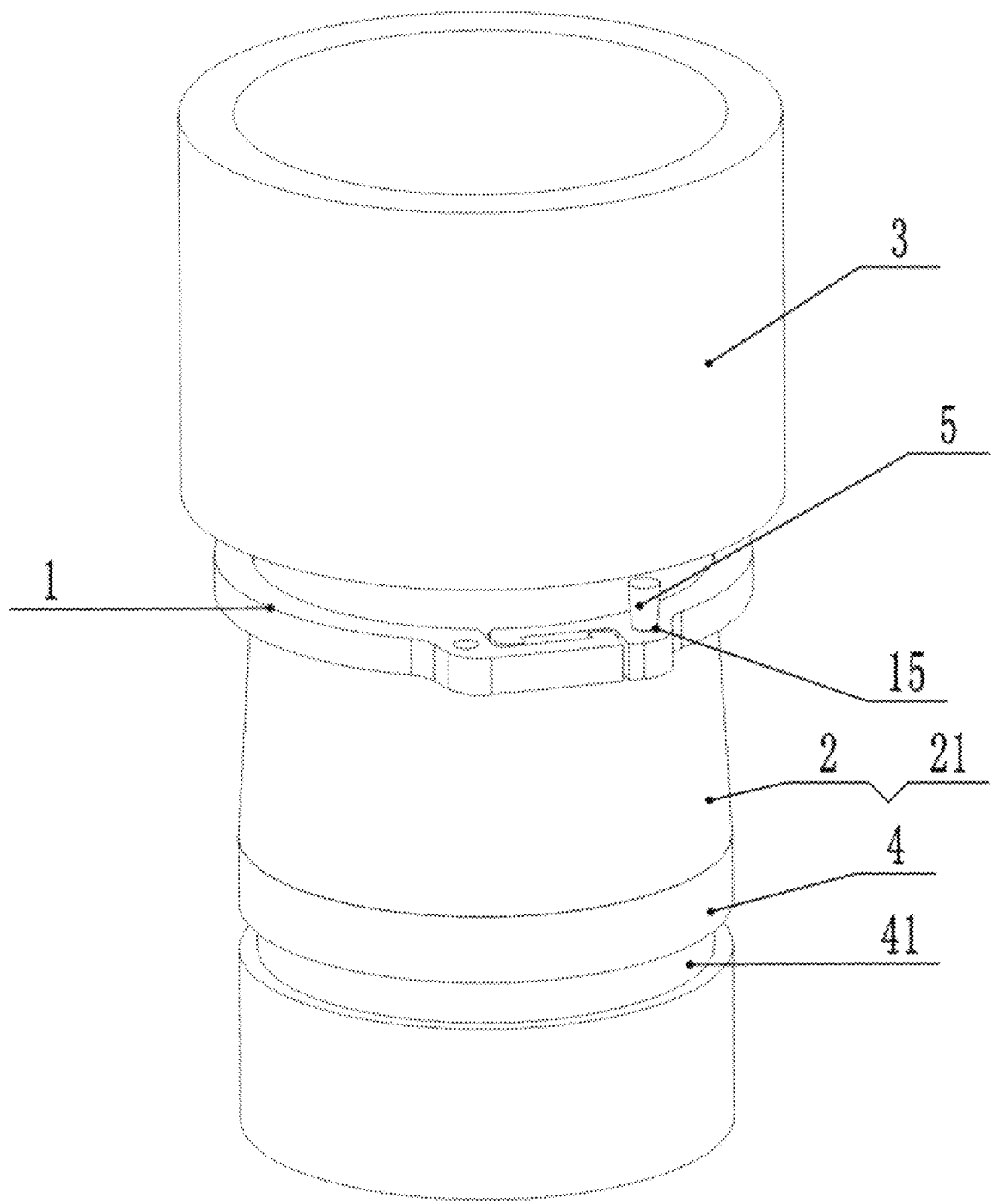
FIG. 6 is a structural diagram of a mounting device for an anti-detachment elastic retaining ring according to an embodiment of the present disclosure (a release protrusion is located on a retaining ring body)

As shown in FIG. 6, a mounting device for an anti-detachment elastic retaining ring includes guide sleeve 2 and target mounting shaft 4 with groove 41. The target mounting shaft 4 is fixed by a fixing assembly (not shown in the figure). The guide sleeve 2 includes conical section 21. A radial dimension of a narrow end of the conical section 21 is less than a locking diameter of the retaining ring body 1, and a radial dimension of a wide end of the conical section 21 is greater than the locking diameter of the retaining ring body 1. The guide sleeve 2 is coaxially coupled with a front end of the groove 41 of the target mounting shaft 4. A wide end of the conical section 21 faces the groove 41.

The mounting device further includes pressing sleeve 3. The pressing sleeve 3 is fitted outside the guide sleeve 2 and moveable axially along the guide sleeve 2. A side of the pressing sleeve 3 close to the target mounting shaft 4 is provided with release protrusion 5. When applied to an automated assembly line, the pressing sleeve 3 is connected to a linear drive device (not shown in the figure) in a drive manner, and the linear drive device is configured to drive the pressing sleeve 3 to move axially.

The pressing sleeve 3 can push the retaining ring body 1 clamped on the conical section 21 towards the groove 41. During this process, the release protrusion 5 can push an end of the opening 10 of the retaining ring body 1, causing the locking fitting surfaces 130 at the two sides of the retaining ring body 1 to offset from each other axially until the retaining ring body 1 enters the axially unlocked state.

It should be noted that, as shown in FIG. 3, when the retaining ring body 1 expands outward from the locked state until the two locking fitting surfaces 130 interlock with each other, the diameter of the retaining ring body is the locking diameter, which is the maximum diameter of the retaining ring body 1 in the locked state. When the retaining ring body 1 is in the axially unlocked state, if the retaining ring body 1 expands outward, the two locking fitting surfaces 130 will not come into contact with each other. Therefore, in this state, the retaining ring body 1 can continue to expand outward to a detached state. In addition, the present disclosure defines the case where the guide sleeve 2 includes the conical section 21, so it is not ruled out that an extension section with a radial dimension greater than the locking diameter and less than the radial dimension of the wide end of the conical section 21 may be provided between the wide end of the conical section 21 and the groove 41 of the guide sleeve 2.

In this embodiment, an outer edge of a cross-section of the conical section 21 is circular. The axial dimension of the retaining ring body 1 is greater than the thickness of the retaining ring body 1.

As shown in FIG. 6, in this embodiment, the release protrusion 5 is located on an axial end surface of the retaining ring body 1. Specifically, an end surface of the first end 11 or the second end 12 is provided with the release protrusion 5. According to the above structure, when the pressing sleeve 3 presses the release protrusion 5, there is no need to perform circumferential positioning of the pressing sleeve 3, achieving simple control.

In this embodiment, the release protrusion 5 is a pin that is detachably provided and set in one of the disassembly holes 15.

Embodiment 4

Figure 7:
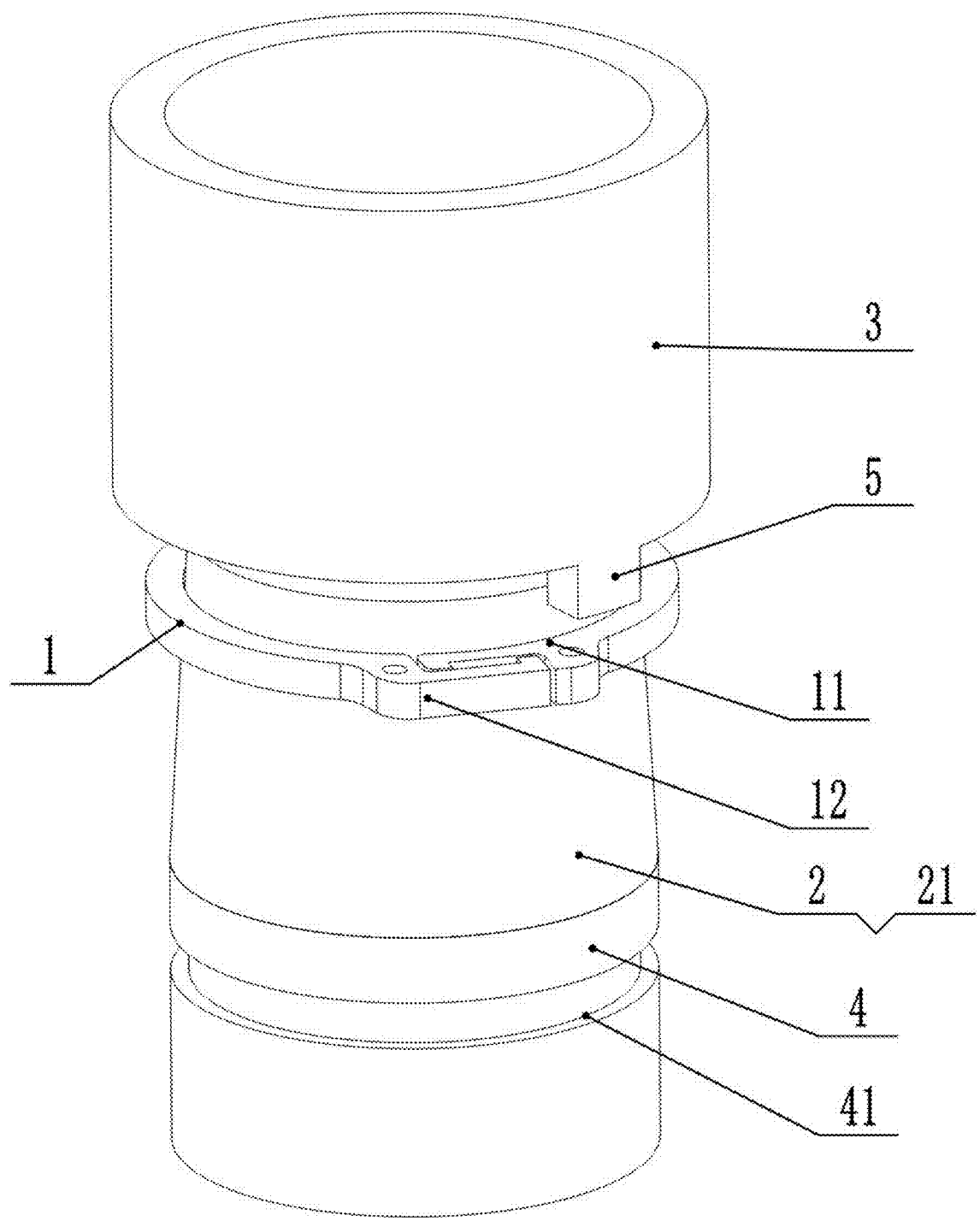
FIG. 7 is a structural diagram of the mounting device for an anti-detachment elastic retaining ring according to an embodiment of the present disclosure (the release protrusion is located on a pressing sleeve)
Figure 8:
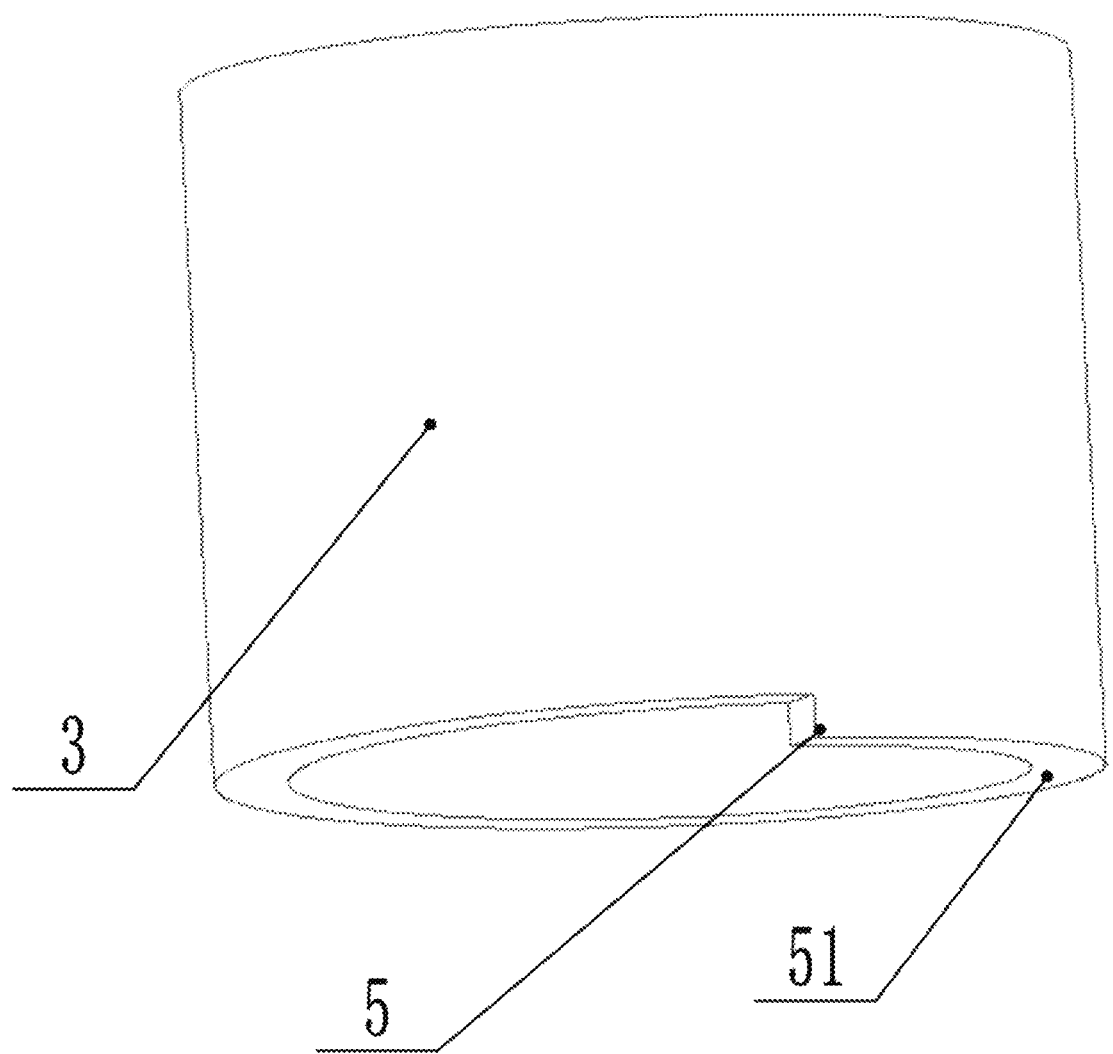
FIG. 8 is a structural diagram of the pressing sleeve of the mounting device for an anti-detachment elastic retaining ring according to an embodiment of the present disclosure.
Figure 9:
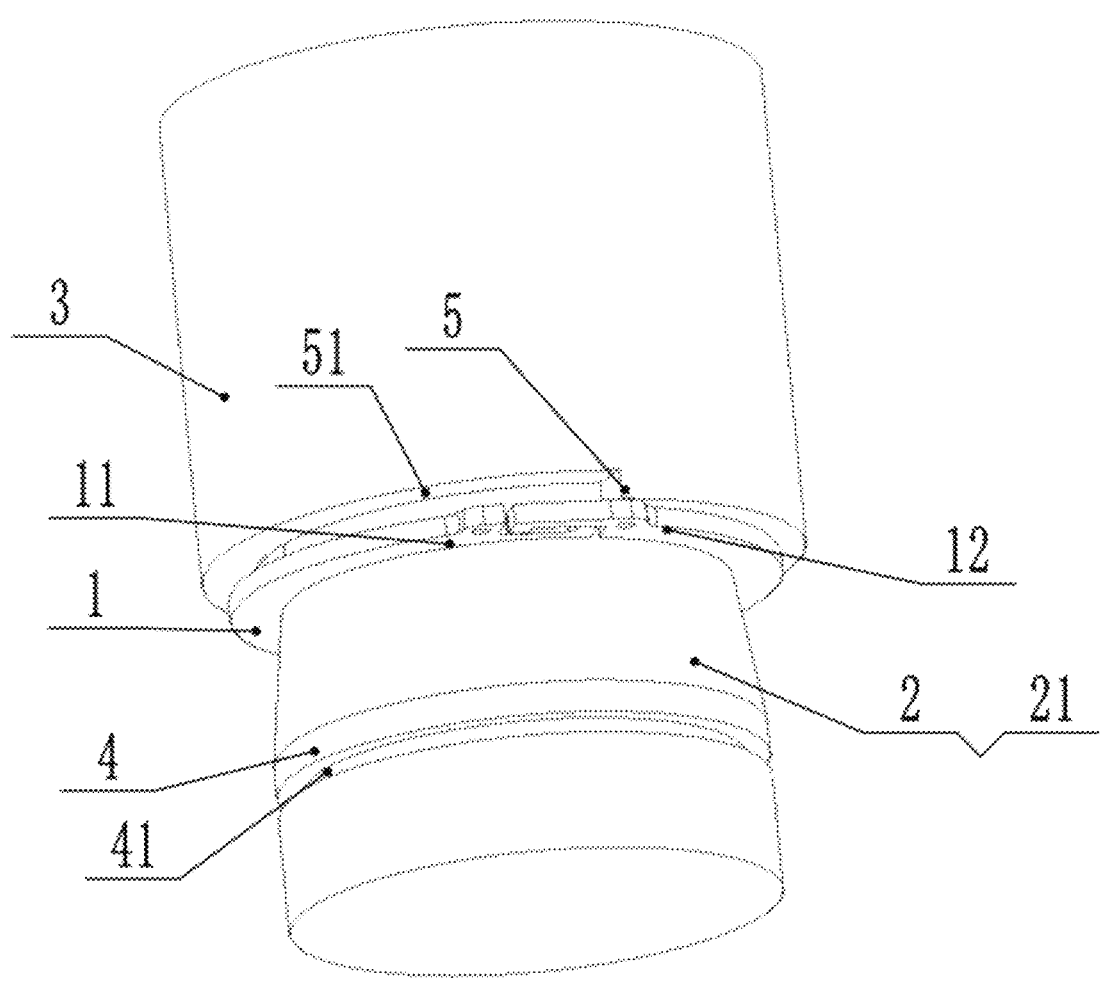
FIG. 9 is a structural diagram of the mounting device for an anti-detachment elastic retaining ring according to an embodiment of the present disclosure.

As shown in FIG. 7, this embodiment differs from Embodiment 3 in that the release protrusion 5 is provided on an end surface of the pressing sleeve 3.

According to Embodiment 3, the release protrusion 5 is provided on the retaining ring body 1 in two cases. In the first case, as mentioned in Embodiment 4, the release protrusion 5 is mounted in separate parts on the retaining ring body 1. In this case, after pressing the retaining ring body 1 into the groove 41, an additional takt is required to remove the release protrusion 5, which affects the assembly efficiency. In the second case, the release protrusion 5 extends onto the retaining ring body 1, increasing the manufacturing complexity of the retaining ring body 1, resulting in high manufacturing costs of the retaining ring body 1, and affecting the compactness of the axial mounting of the retaining ring body 1.

In this embodiment, the release protrusion 5 is located on the pressing sleeve 3, overcoming the disadvantage of providing the release protrusion 5 on the retaining ring body 1. It should be noted that in order to achieve automatic assembly, the release protrusion 5 must be aligned with an end at a side of the opening 10 of the retaining ring body 1, and the two ends cannot be pressed down at the same time, otherwise it will cause assembly failure. To ensure the implementation of the circumferential positioning, an automatic robotic arm can be used for feeding. Specifically, a robotic arm can be used to separate and remove the pre-positioned retaining ring body 1 (to achieve pre-positioning, a batch of retaining ring bodies 1 are placed in a circumferential positioning tray of a raw material tray). According to a pre-set program, the retaining ring body 1 is placed on the conical section 21 at a preset circumferential angle, and then the pressing sleeve 3 is started to move, thereby ensuring the implementation of the above function.

Embodiment 5

As shown in FIGS. 8 to 14, based on Embodiment 4, in this embodiment, a side of the release protrusion 5 extends helically along the circumferential and axial directions of the pressing sleeve 3 to form transition fitting surface 51.

When the release protrusion 5 pushes an end of the opening 10 of the retaining ring body 1, the retaining ring body 1 is fully fitted with the transition fitting surface 51, improving the stability of the retaining ring body 1 being pushed by the pressing sleeve 3. In this embodiment, the release protrusion 5 is integrally formed with the pressing sleeve 3. The release protrusion 5 is in the shape of a step. The transition fitting surface 51 extends helically from a front end of the release protrusion 5 to a root of the release protrusion 5.

Embodiment 6

In the present disclosure, a mounting method for the anti-detachment elastic retaining ring capable of springing back for self-locking as described in Embodiments 1 and 2 includes the following steps.

Step S1. An unlocking operation is performed to change the retaining ring body 1 from its original state to a detached state.

Step S2. An expansion operation is performed to expand the retaining ring body 1 until its inner diameter is greater than or equal to a diameter of the target mounting shaft 4.

Step S3. A movement operation is performed to move the retaining ring body 1 axially to an axial outer side of the groove 41.

Specifically, in this step, the retaining ring body 1 can move axially to a journal at a front side of the groove 41 of the target mounting shaft 4. At this point, the external support force applied to the retaining ring body 1 is removed, and the retaining ring body 1 is in a detached state, and is clamped onto the journal of the target mounting shaft 4.

Step S4. An insertion operation is performed to move the retaining ring body 1 axially into the groove 41. At this point, the retaining ring body 1 is reset from the detached state to the locked state due to its own rebound force, and is clamped into the groove 41.

Based on the above method, the anti-detachment elastic retaining ring capable of springing back for self-locking described in the present disclosure can eliminate the execution mechanism for locking operation during automated assembly, and even eliminate the takt of locking operation, thereby improving assembly efficiency and suiting for automated production.

Embodiment 7

A usage method of the mounting device for the anti-detachment elastic retaining ring as described in Embodiments 3 to 5 is configured to mount the anti-detachment elastic retaining ring capable of springing back for self-locking as described in Embodiments 1 and 2. As shown in FIGS. 9 to 14 (taking Embodiment 5 as an example), the usage method includes the following steps.

Step S11. An axial unlocking operation is performed. The retaining ring body 1 is fitted from the narrow end of the conical section 21 onto the conical section 21. The pressing sleeve 3 moves towards the retaining ring body 1. The release protrusion 5 pushes an end of the retaining ring body 1 to move, such that the retaining ring body enters the axially unlocked state.

Step S12. A radial unlocking operation is performed. The pressing sleeve 3 pushes the retaining ring body 1 towards the wide end of the conical section 21 until the retaining ring body 1 enters the detached state. The steps S11 and S12 correspond to the step S1 in Embodiment 6.

Step S2". An expansion operation is performed. The pressing sleeve 3 pushes the retaining ring body 1 to move towards the wide end of the conical section 21. The retaining ring body 1 expands until its inner diameter is greater than or equal to the diameter at the front end of the groove 41 of the target mounting shaft 4.

It should be noted that the diameter of the journal at the front end of the groove 41 is greater than the locking diameter of the retaining ring body 1. In this embodiment, the step S2' corresponds to the step S2 in Embodiment 6.

Step S3'. A movement operation is performed. The pressing sleeve 3 continues to push the retaining ring body 1 to move, so the retaining ring body 1 moves axially until the front end of the retaining ring body 1 is located at the axial outer side of the groove 41. Specifically, when a tail end of the guide sleeve 2 is located at and fitted to the outer edge of the groove 41, the retaining ring body 1 is integrally fitted onto the guide sleeve 2. In this embodiment, the tail end of the guide sleeve 2 is axially fitted to the journal at the front end of the groove 41. Therefore, in this step, the retaining ring body 1 moves axially to the journal at the front side of the groove 41. In this embodiment, the step S3' corresponds to the step S3 in Embodiment 6.

Step S41. A one end insertion operation is performed. The pressing sleeve 3 continues to push the retaining ring body 1 to move until the end of the retaining ring body 1 pushed out by the release protrusion 5 is inserted into the groove 41.

Step S42. An overall insertion operation is performed. After one end of the retaining ring body 1 is inserted into the groove, the other end of the retaining ring body follows the one end to be inserted into the groove due to the rebound force. The steps S41 and S42 correspond to the step S4 in Embodiment 6. It should be noted that the automatic insertion of the other end into the groove is the result of the combined action of the axial and circumferential elastic forces of the retaining ring body 1. The prerequisite for achieving this effect is related to the depth of the groove 41 and the dimension parameters of the journal at the outer end of the groove 41. In this embodiment, the retaining ring body 1 is made of spring steel, and its overall dimension parameters, as well as the dimension parameters of the groove 41 and the journal, refer to the provisions of the standard GB/T894-2017 for open snap rings. A sample test indicates that the effects of the steps S41 and S42 can be achieved. In the test, the retaining ring body 1 features an inner diameter of 45.8 mm, an outer diameter of 56 mm, a thickness of 2 mm, and is made of 60Si2Mn. The groove 41 features an inner diameter of 47 mm. The use of a standard snap ring for the above test in the method can also achieve the effect of following the other end to be inserted into the groove as described in the step S42.

Embodiment 8

On the basis of Embodiment 4 or 5, in this embodiment, the pressing sleeve 3 is rotatable in a circumferential direction of the target mounting shaft 4.

Based on the above structure, when the usage method of the mounting device for an anti-detachment elastic retaining ring described in Embodiment 7 is implemented, after the step S41 is completed, if the other end of the retaining ring body 1 cannot automatically be inserted into the groove by its own rebound force after one end is pressed into the groove 41, the step S42' is performed. The pressing sleeve 3 rotates at an inner side in the circumferential direction at the one end of the retaining ring body 1 pressed into the pressing groove 41. At this point, the release protrusion 5 presses the portion not inserted into the groove 41 into the groove 41, ensuring that the two ends of the retaining ring body 1 are inserted into the groove 41. Therefore, in this embodiment, the steps S41 and S42' correspond to the step S4 in Embodiment 6.

Embodiment 9

In Embodiment 6, to perform the steps S1 and S2, the retaining ring body 1 can be pre-loosened to a diameter greater than or equal to that of the target mounting shaft 4 using snap ring pliers. In the step S3, the retaining ring body 1 is fully fitted onto the journal at the front end of the groove 41 of the target mounting shaft 4, and then the snap ring pliers are removed. The retaining ring body 1 is in a detached state, and is clamped onto the journal of the target mounting shaft 4. Finally, the step S4 is performed.

The technical principles of the present disclosure are described with reference to the specific embodiments. The description is merely intended to explain the principles of the present disclosure, rather than to limit the protection scope of the present disclosure in any way. Based on the explanation herein, those skilled in the art may derive other specific implementations of the present disclosure without creative effort, but these implementations should fall within the protection scope of the present disclosure.

What is claimed is:

1. An anti-detachment elastic retaining ring capable of springing back for self-locking, comprising a retaining ring body, wherein the retaining ring body is provided with an opening; and corresponding to two sides of the opening, two ends of the retaining ring body respectively form a first end and a second end;

wherein the retaining ring body in an original state is in a sheet shape as a whole;

when the retaining ring body is in the original state, the first end and the second end interlock with each other; corresponding to interlocking front end positions of the first end and the second end, front ends of the first end and the second end are respectively provided with a first connecting extension section and a second connecting extension section; the first connecting extension section and the second connecting extension section extend laterally to form a first limiting protrusion and a second limiting protrusion, respectively; the first limiting protrusion and the second limiting protrusion are located at an inner side of each other in a circumferential direction of the retaining ring body; adjacent sides of the first limiting protrusion and the second limiting protrusion are provided with locking fitting surfaces; and a side of the first limiting protrusion away from the second limiting protrusion and/or a side of the second limiting protrusion away from the first limiting protrusion is provided with an inclined guide surface;

when the retaining ring body expands outward from a locked state, the two locking fitting surfaces are fitted and interlocked with each other, preventing the retaining ring body from expanding outward to a detached state; and through the inclined guide surface of the first limiting protrusion and/or the inclined guide surface of the second limiting protrusion, the retaining ring body is reset to the locked state from the detached state by a rebound force of the retaining ring body;

wherein when the first limiting protrusion and the second limiting protrusion are offset from each other by a first preset distance in an axial direction, wherein the axial direction is perpendicular to a plane formed by a circumference of the retaining ring body; the retaining ring body is in an axially unlocked state; and the retaining ring body is allowed to reset from the axially unlocked state to the locked state by the rebound force of the retaining ring body;

wherein when the retaining ring body is in the original state, the first limiting protrusion and the second limiting protrusion are separated by a second preset distance.

2. The anti-detachment elastic retaining ring capable of springing back for self-locking according to claim 1, wherein when the retaining ring body is in the original state, the second connecting extension section is located at an outer side of the first connecting extension section in a radial direction of the retaining ring body.

3. The anti-detachment elastic retaining ring capable of springing back for self-locking according to claim 2, further comprising disassembly holes, wherein the disassembly holes comprise a first disassembly hole; and the first disassembly hole is provided at the second end.

4. The anti-detachment elastic retaining ring capable of springing back for self-locking according to claim 3, wherein the disassembly holes further comprise a second disassembly hole; and the second disassembly hole is provided at the first end.

5. The anti-detachment elastic retaining ring capable of springing back for self-locking according to claim 4, wherein the first disassembly hole of the second end or the second disassembly hole of the first end is detachably provided with a release protrusion.

6. The anti-detachment elastic retaining ring capable of springing back for self-locking according to claim 1, wherein front ends of the first limiting protrusion and the second limiting protrusion in an extension direction extend towards the inner side of each other in the circumferential direction of the retaining ring body to form a pair of interlocking hooks; and the locking fitting surface is located at an inner side of the interlocking hook.

7. A mounting method for an anti-detachment elastic retaining ring capable of springing back for self-locking, wherein the anti-detachment elastic retaining ring comprises a retaining ring body, wherein the retaining ring body is provided with an opening; and corresponding to two sides of the opening, two ends of the retaining ring body respectively form a first end and a second end;

wherein the retaining ring body in an original state is in a sheet shape as a whole;

when the retaining ring body is in the original state, the first end and the second end interlock with each other; corresponding to interlocking front end positions of the first end and the second end, front ends of the first end and the second end are respectively provided with a first connecting extension section and a second connecting extension section; the first connecting extension section and the second connecting extension section extend laterally to form a first limiting protrusion and a second limiting protrusion, respectively; the first limiting protrusion and the second limiting protrusion are located at an inner side of each other in a circumferential direction of the retaining ring body; adjacent sides of the first limiting protrusion and the second limiting protrusion are provided with locking fitting surfaces; and a side of the first limiting protrusion away from the second limiting protrusion and/or a side of the second limiting protrusion away from the first limiting protrusion is provided with an inclined guide surface;

when the retaining ring body expands outward from a locked state, the two locking fitting surfaces are fitted and interlocked with each other, preventing the retaining ring body from expanding outward to a detached state; and through the inclined guide surface of the first limiting protrusion and/or the inclined guide surface of the second limiting protrusion, the retaining ring body is reset to the locked state from the detached state by a rebound force of the retaining ring body;

wherein when the first limiting protrusion and the second limiting protrusion are offset from each other by a first preset distance in an axial direction, wherein the axial direction is perpendicular to a plane formed by a circumference of the retaining ring body; the retaining ring body is in an axially unlocked state; and the retaining ring body is allowed to reset from the axially unlocked state to the locked state by the rebound force of the retaining ring body;

wherein when the retaining ring body is in the original state, the first limiting protrusion and the second limiting protrusion are separated by a second preset distance;

wherein the mounting method comprises the following steps:

step S1: unlocking: changing the retaining ring body from the original state to the detached state;

step S2: expansion: expanding the retaining ring body until an inner diameter of the retaining ring body is greater than or equal to a diameter of a target mounting shaft;

step S3: movement: moving the retaining ring body axially to an axial outer side of a groove; and step S4: insertion: moving the retaining ring body axially into the groove, wherein the retaining ring body is reset from the detached state to the locked state due to the rebound force of the retaining ring body and is clamped into the groove.

8. The mounting method according to claim 7, wherein in the anti-detachment elastic retaining ring, when the retaining ring body is in the original state, the second connecting extension section is located at an outer side of the first connecting extension section in a radial direction of the retaining ring body.

9. The mounting method according to claim 8, wherein the anti-detachment elastic retaining ring further comprises disassembly holes, wherein the disassembly holes comprise a first disassembly hole; and the first disassembly hole is provided at the second end.

10. The mounting method according to claim 9, wherein in the anti-detachment elastic retaining ring, the disassembly holes further comprise a second disassembly hole; and the second disassembly hole is provided at the first end.

11. The mounting method according to claim 10, wherein in the anti-detachment elastic retaining ring, the first disassembly hole of the second end or the second disassembly hole of the first end is detachably provided with a release protrusion.

12. The mounting method according to claim 7, wherein in the anti-detachment elastic retaining ring, front ends of the first limiting protrusion and the second limiting protrusion in an extension direction extend towards the inner side of each other in the circumferential direction of the retaining ring body to form a pair of interlocking hooks; and the locking fitting surface is located at an inner side of the interlocking hook.

* * * * *